Patented Apr. 18, 1939

2,154,552

UNITED STATES PATENT OFFICE 2,154,552

PENTAERYTHRITOL TETRANITRATE EXPLOSIVE

Joseph A. Wyler, Allentown, Pa., assignor to Trojan Powder Company, Allentown, Pa.

No Drawing. Application November 4, 1938, Serial No. 238,803

7 Claims. (Cl. 52—13)

This invention relates to a composition of matter and to a process for the preparation of same; and particularly relates to a nitrated pentaerythritol composition.

Nitrated pentaerythritol, as is well known, is a very powerful and effective explosive, but has the disadvantageous property of being too sensitive to friction. Consequently, its use in commercial blasting explosives has thus far been impracticable.

I have discovered that it is possible to prepare a pentaerythritol tetranitrate composition of such characteristics that the product is of low sensitiveness toward friction and well adapted for use in commercial explosives.

It is an object of my invention to provide a process for the preparation of a pentaerythritol tetranitrate composition possessing satisfactory heat stability and resistance toward detonation due to friction. It is a further object to provide a pentaerythritol tetranitrate composition of a specific physical constitution and of such a chemical composition as to be useful in commercial explosives. Other and further objects will become apparent upon perusal of this specification and claims.

All known processes for the preparation of pentaerythritol tetranitrate are based upon the nitration of pentaerythritol, and the latter is made by the condensation, in alkaline media, of four molecules of formaldehyde with one molecule of acetaldehyde. This condensation is usually carried out at temperatures ranging from 10° C. to 50° C., in concentrations of aldehydes of from 3% to 20%; with proportions of $CH_2O$ to $CH_3CHO$ of from 4:1 to 5:1; and over time intervals of from a few hours to several weeks. In all cases, however, the yields are less than one hundred percent of theory.

In addition to the pentaerythritol formed in the condensation reaction mentioned above, other products, such as dipentaerythritol and a syrupy liquid of unknown composition, result.

In the present application the term "pentaerythritol" is used to cover both pentaerythritol and dipentaerythritol, and the term "polyhydroxide" is used for the syrupy liquid.

I have discovered that if the product resulting from the condensation of $CH_2O$ and $CH_3CHO$ is dried, nitrated, drowned, stabilized and washed in accordance with my process, a pentaerythritol tetranitrate composition results which has the desired insensitiveness toward friction and still possesses the other desirable properties requisite for a commercial explosive.

My invention therefore comprehends the simultaneous nitration of pentaerythritol and the liquid by-product formed during the condensation, followed by treatments in which these two nitrated constituents are simultaneously processed. More specifically, I start with a substantially dry mixture of pentaerythritol and the liquid product; nitrate this in any suitable manner, drown and wash the nitrated product in water; heat this washed product in an excess of hot water for from three to twelve hours, in one or several steps, using fresh water for each step; filter, wash with water, and transfer to a 2% solution of sodium carbonate; stir, filter, wash, and dry. The resulting product is my composition of matter.

In order more clearly to point out my invention I give the following example, taken in part, from my copending application, S. N. 200,683.

Example 396 parts (by weight) of 30.34% formaldehyde and 79.5 parts (by weight) of 52.8% of commercial acetaldehyde are mixed with 966 parts (by weight) of water in a suitable container provided with a stirrer. To this is slowly added, with stirring, a mixture of 35 parts (by weight) of CaO and 100 parts (by weight) of water. This slurry is added over a period of four to six hours and the reaction mixture is kept at approximately 20–30° C. throughout the period of addition.

Just before the addition of the lime slurry, 0.25 part of finely powdered copper oxalate is added to the mixture of aldehydes.

After all the lime has been added, the stirring is continued until an iodine titration indicates less than, say, 0.10% total aldehydes, calculated to per cent $CH_2O$. The time required to arrive at this point varies with conditions but is usually not over 20 hours.

The reaction mixture, at completion, generally is colorless or of a slight greenish cast. It is then treated with slightly less sulphuric acid than is theoretically equivalent to the lime used. This precipitates the lime as calcium sulfate. In order to precipitate all of the lime out of solution, a small amount of oxalic acid is added in the form of a water solution and the mixture stirred for an hour or more. The mixture is then filtered. The filtrate is evaporated to the substantial absence of water. This evaporation is best carried out in a vacuum grainer at a temperature less than 70° C. The yield is about 135 parts and the product is of a light cream color and consists of crystals of pentaerythritol and dipentaerythritol with a small proportion of syrup intimately associated with it.

The details just given in my example are not part of my present invention but are given to show one way in which I obtain the raw material used to make my composition of matter. It is of course understood that I may use any suitable method for obtaining this raw material.

I next nitrate this product in a manner of which the following is illustrative:

140 parts (by weight) of raw material are fed to 640 parts (by weight) of 95% $HNO_3$ at a temperature of from 0° C. to 30° C., and contained in a suitable nitrator provided with a stirrer. After all of the raw material has been fed, 815 parts (by weight) of oil of vitriol are added with stirring. The charge is stirred for about one-half hour additional, when it is drowned in a large excess of cold water. This precipitates a white, crystalline, readily filtrable product, which at this stage of the process is distinctly unstable. It is rendered stable by heating, with stirring, in contact with an excess of water at 85–100° C. This stabilizing operation may be carried out in one to four 3-hour batch-treatments, using fresh water for each treatment. The "boiling" being completed, the nitrated material is filtered, washed with cold water, and transferred to a 2% water solution of $Na_2CO_3$, or of any suitable alkali, stirred for about one hour or more, filtered, washed and dried. This product is my composition of matter.

I wish, at this point, to emphasize that there is nothing new in nitrating pentaerythritol, or dipentaerythritol, as mentioned above, and then drowning the resulting mixture in an excess of cold water; but it is new, so far as I know, to simultaneously nitrate a mixture consisting of pentaerythritol, and the liquid by-product obtained as above, drowning the nitration mixture in water, stabilizing by "boiling", neutralizing with an alkali, washing and drying. The application of this combination of steps to the mixture of pentaerythritol and liquid product has resulted in certain new and useful results. Thus, the nitrated product consists of individual crystals of pentaerythritol tetranitrate which are saturated or super-saturated and coated with a thin layer of this nitrated liquor. This is a very significant result, particularly for an explosive. This intimacy and uniformity of contact of these two types of nitrated materials enables me to produce a pentaerythritol tetranitrate in crystalline, pourable form which is insensitive enough toward friction to permit this material to be used in commercial explosives and which is stable enough toward heat to pass the most rigid requirements of the industry in this respect. To nitrate each of these materials separately and to then mix these nitrated products mechanically does not make the product of my invention. The co-nitration of these materials and the co-processing thereafter are essential to my invention; the drowning step after the nitration performs the function of co-precipitating pentaerythritol tetranitrate and nitrated liquor, forming a solid solution of the liquid nitrate in the pentaerythritol tetranitrate and a film of liquid nitrate around the crystals; and the water "boiling" treatment removes free acid from the nitrates, impregnates the spaces between the pentaerythritol tetranitrate crystals with liquid nitrate and in conjunction with the soda solution, stabilizes the composition toward heat—the combined effect of these steps resulting in my composition of matter.

It will be understood that my process begins with the nitration of a mixture of pentaerythritol and the liquid product simultaneously resulting when formaldehyde and acetaldehyde are condensed to pentaerythritol in alkaline media. The present application is concerned with the co-nitration of this liquid product and pentaerythritol, combined with the washing and stabilizing steps as indicated above.

The product resulting from my process has a wide range of usefulness in explosives. Thus, it may be used alone or in combination with other explosives as nitrostarch, nitrocellulose, trinitrotoluene, tetryl, nitroglycerine, nitroglycol and ammonium nitrate; with oxidizing agents as sodium, potassium, calcium, barium and lead nitrates, and so forth; with combustibles as charcoal, wood pulp, coal dust and the like; and with modifying agents as paraffin, vaseline, and mineral oils. When used with nitrostarch, particularly good results are obtained from the standpoint of "gap" sensitiveness and detonative sensitiveness, of the pentaerythritol tetranitrate composition of matter contains 70% or more of pentaerythritol tetranitrate.

In the example mentioned above, I give definite operative details. I do not, however, confine or limit myself to these. The example is given merely for purposes of illustration and clarity, and I may vary any of the operative details in any manner that would occur to a worker skilled in this art, without departing from the essence of this invention; and I therefore do not limit myself in any way except as indicated by the appended claims.

For convenience and definiteness in the claims I have coined the term "polyhydroxide". This term, as previously defined, is applied to the syrupy liquid formed during the alkaline condensation of formaldehyde and acetaldehyde to pentaerythritol.

I claim:

1. The process for the preparation of a low friction-sensitive pentaerythritol tetranitrate composition comprising, co-nitration of a mixture of pentaerythritol and "polyhydroxide" drowning of resultant mixture in water and by stabilizing.

2. The process for the preparation of a low friction-sensitive pentaerythritol tetranitrate composition comprising, co-nitration of a mixture of pentaerythritol and "polyhydroxide" drowning of resultant mixture in water, washing with water, heating and stirring it in hot water washing with water, neutralizing excess acidity with a water soluble alkali washing with water and dyring.

3. A composition of matter comprising pentaerythritol tetranitrate and nitrated "polyhydroxide"; said pentaerythritol tetranitrate being present in crystalline condition and containing nitrated "polyhydroxide" in solution.

4. A composition of matter comprising pentaerythritol tetranitrate and nitrated "polyhydroxide"; said pentaerythritol tetranitrate being present in crystalline condition, and said nitrated "polyhydroxide" being, in part, in solution in the pentaerythritol tetranitrate, and in part, coated on the outside of the crystals of the pentaerythritol tetranitrate.

5. A composition of matter comprising pentaerythritol tetranitrate and nitrated "polyhydroxide"; said pentaerythritol tetranitrate be present to the extent of at least 70%, by weight, and in crystalline condition; and said nitrated "polyhydroxide" being, in part, in solution in the pentaerythritol tetranitrate, and in part, coated on the outside of the crystals of the pentaerythritol tetranitrate.

6. An explosive comprising pentaerythritol tetranitrate and nitrated "polyhydroxide"; said pentaerythritol tetranitrate being present in crystalline condition and said nitrated "polyhydroxide" being, in part, in solution in said pentaerythritol tetranitrate, and in part, coated on the outside of the crystals of the pentaerythritol tetranitrate.

7. An explosive comprising nitrostarch, pentaerythritol tetranitrate and nitrated "polyhydroxide"; said pentaerythritol tetranitrate being present in crystalline condition and said nitrated "polyhydroxide" being, in part, in solution in said pentaerythritol tetranitrate, and in part, coated on the outside of the crystals of the pentaerythritol tetranitrate; and said pentaerythritol tetranitrate being present to the extent of at least seven parts pentaerythritol tetranitrate to three parts of nitrated "polyhydroxide".

JOSEPH A. WYLER.